Dec. 30, 1947.  C. H. ANGELL  2,433,561

DEVICE FOR ORIENTING ARTICLES

Filed March 26, 1945   2 Sheets-Sheet 1

INVENTOR.
CHARLES H. ANGELL
BY Benedict & Swartwood
ATTORNEYS

Dec. 30, 1947.   C. H. ANGELL   2,433,561
DEVICE FOR ORIENTING ARTICLES
Filed March 26, 1945   2 Sheets-Sheet 2

INVENTOR.
CHARLES H. ANGELL
BY Benedict & Swartwood
ATTORNEYS

Patented Dec. 30, 1947

2,433,561

UNITED STATES PATENT OFFICE 2,433,561

DEVICE FOR ORIENTING ARTICLES

Charles H. Angell, Danville, Ill., assignor to Samuel C. Hurley, Jr., Danville, Ill.

Application March 26, 1945, Serial No. 584,943

1 Claim. (Cl. 209—72)

This invention relates to a hopper for delivering articles, introduced thereto in heterogeneous arrangement, individually and successively and in an oriented manner. More specifically, it relates to a hopper device adapted to successively deliver unit elongated objects having one end larger than the other in a manner that the larger end always leaves the hopper first.

Another object of the invention is to provide a pick-up ring, in a hopper device, having slots which permit easy access of the smaller end of the article while preventing access of the larger end of the article, and at the same time minimizing any jamming due to the tendency of the larger end of the article to enter the slot in the pick-up ring.

A further object of the invention is to provide means to return to the hoppering device from the pick-up ring any articles which are not properly oriented so as to always insure that the articles leaving the hopper are oriented in the right direction.

A more specific object of the invention is to provide a novel and improved delivery chute having openings therein which remove the excess over and above the required amount to be delivered from the hopper and return such excess to the hopper to be again picked up by the pick-up ring. This prevents building-up of the articles in the chute which might cause jamming.

Other advantages, uses, objects, and utility of my invention will become apparent by referring to the drawings.

The accompanying diagrammatic drawings illustrate one specific form of the device provided by the invention.

Fig. 1 is an elevational view of hopper shown partially in section.

Fig. 2 is a view of a portion of the hopper as seen from a plane indicated by line 2—2 in Fig. 1, with a portion of members 9 and 10 cut away.

Figure 1:
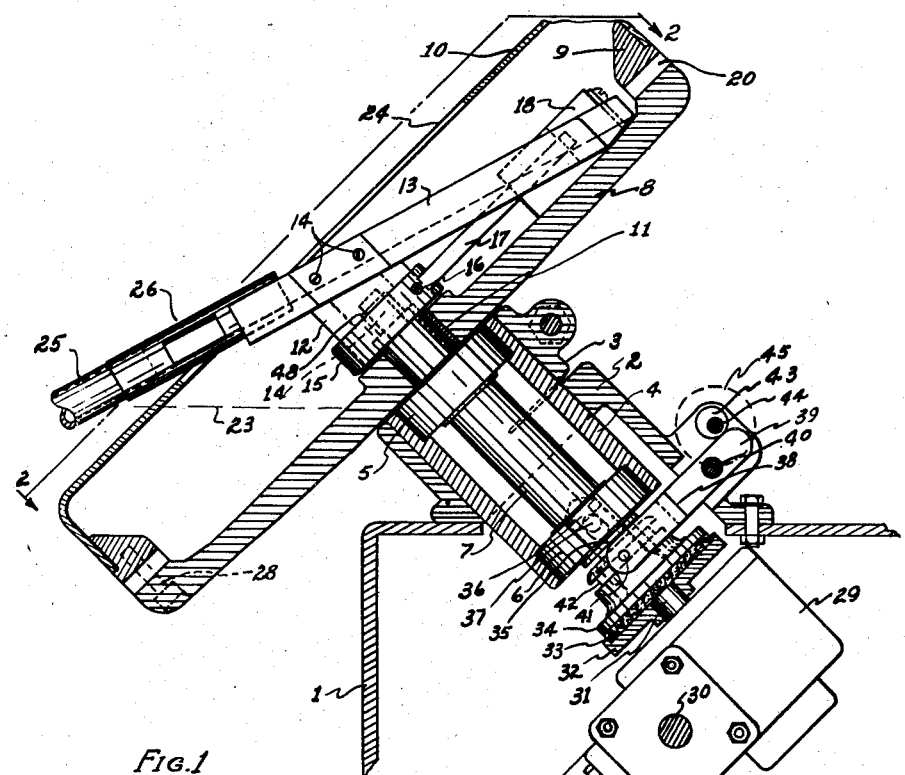

Referring now to Fig. 1, the hoppering device here shown is mounted on and disposed partially within the case of the machine to which the hoppered parts are fed. A portion of such a case is indicated at 1. A pedestal 2, which may be bolted or otherwise suitably attached to case 1, is provided with an integral split collar, indicated at 3, which clamps about a sleeve 4 and retains the latter in place. Bearings 5 and 6 are mounted securely within sleeve 4 and a rotatable shaft 7 passes through these bearings, in which it is journaled.

The rotatable bowl of the hopper, in which a supply of the parts being hoppered is kept, comprises the bottom plate 8, the cover ring 9 and the bell or cover 10. The bell 10 slips over the ring 9 and rests on a shoulder provided on the ring, as shown. Ring 9 may be bolted, as shown at 28, or otherwise suitably attached to plate 8 to cover an upstanding peripheral lip provided on the latter in which the grooves 20 and 21 are cut or otherwise suitably formed.

Alternatively grooves like 20 and 21 may be provided in member 9 instead of in member 8, in which case the ring 9 is made sufficiently thick to accommodate these grooves and the upstanding lip on member 8 is not so high. As another alternative members 8 and 9 may be integral, but grooves 20 and 21 are more easily formed when parts 8 and 9 are separate.

The bottom plate 8 of the hopper bowl is keyed, as shown at 11, or otherwise suitably attached to shaft 7, so that the entire hopper bowl turns with shaft 7. A mounting post 12, slotted at its top to receive chute 13, is journaled to and rides on an extension 14 of shaft 7 which is reduced in diameter. A suitable snap-ring 48 retains the post 12 on the shaft. A collar 15 secured to post 12 by set screw 16 carries arm 17 which, in turn, carries the mounting block 18 to which the pick-off spring 19 is attached (see Fig. 2). The function of the pick-off spring will be later explained.

Figure 2:
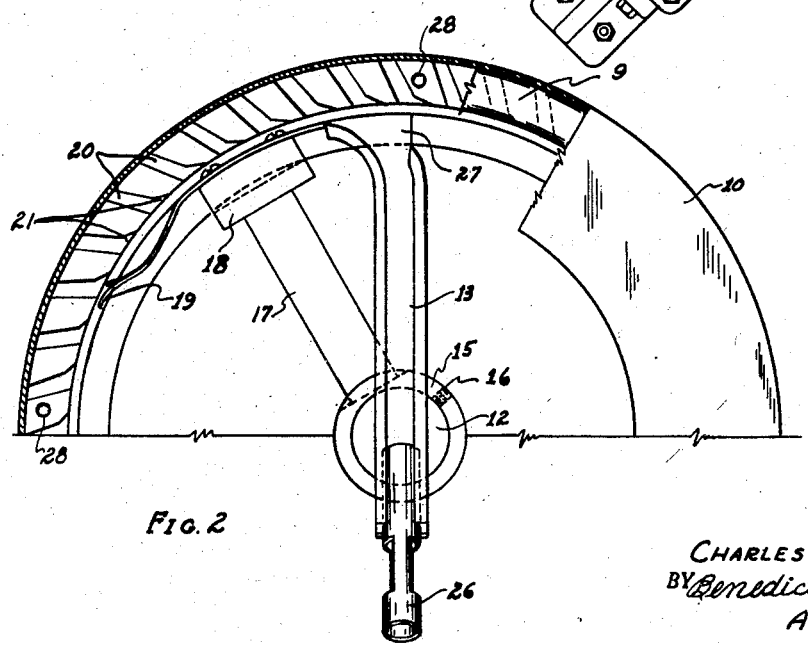

The grooves 20 and 21 are provided in member 8 at equally spaced intervals about its circumference, as will be apparent with reference to Fig. 2. The grooves 20 are of sufficient width, depth and length to allow the shank of the part being hoppered to enter freely and to fall freely therefrom when the hopper bowl is rotated but these grooves are not sufficiently large to receive the enlarged head of the part being hoppered. The grooves 21 serve to flare out the grooves 20 adjacent their inner ends and lead the shanks of the part to be hoppered into the grooves 20 as the hopper bowl rotates.

Figure 4:
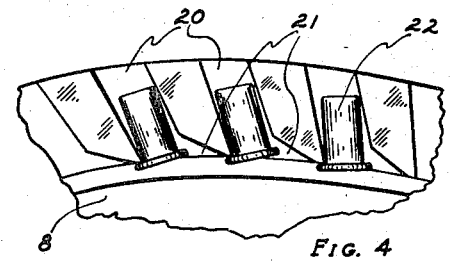
Fig. 4 is an enlarged view of a portion of member 8 showing a part suitable for hoppering in this device in place in one of the slots 20.

A part 22, similar in general form to a bolt or rivet and suitable for hoppering in the device herein described, is shown in place in one of the grooves 20 in Fig. 4. A mass of such parts is placed in the hopper bowl, filling it, for example, to the approximate level indicated by the broken line 23 in Fig. 1. This mass may, of course, be periodically replenished, the top of the hopper bowl being open as indicated at 24, and this may be done while the hopper is in operation with the bowl rotating.

The hopper bowl is rotated in a clockwise direction, in the case illustrated, and as the grooves or recesses 20 and 21 pass beneath the mass of parts in the lower portion of the bowl, the parts are individually urged into the recesses by the rotary motion of the hopper bowl and the turbulence created in the mass of said parts. Usually at least 50% of the recesses receive a part on each revolution of the hopper bowl. As the bowl rotates the parts are carried upwardly in the recesses to a position opposite the upper end of chute 13, where they are free to slide from the recesses into the chute, head foremost.

They can only emerge head foremost from the recesses because only the smaller end or shank of the part can enter a recess. The parts are delivered by gravity down chute 13, still in a head foremost position. Some or all of these parts pass through the drop-out tube 26 at the lower end of chute 13 into the delivery tube 25, through which they are directed to the equipment, not shown, where they are to be inspected, incorporated in an assembly, or where some other desired operation is performed thereon.

Figure 3:
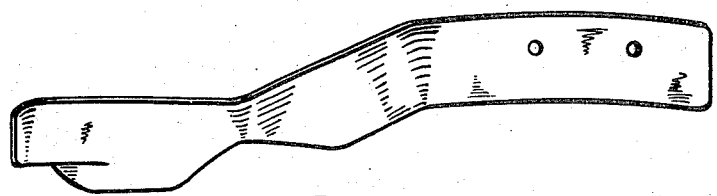
Fig. 3 is an enlarged detail of the pick-off spring 19 shown in Fig. 2.

The function of pick-off spring 19, shown in Figs. 2 and 3, is to separate "riders" from the parts which are properly seated in recesses 20. These "riders" are parts which catch on the heads of other parts and tend to ride around as the hopper bowl rotates without being properly positioned in the recesses provided. They would not fall properly into chute 13 and so are removed by member 19 before they travel far. Member 19 and its anchor block 18 also serve to prevent properly placed parts from falling from the recesses 20 before they reach chute 13.

The rotation of the hopper imparts some momentum to the parts as they leave the recesses 20 and preferably the top of chute 13 is formed, as shown, to approximately correspond with the normal arc of travel for the disengaged parts. Also, in the case illustrated, the right hand side rail of the chute is left short at the top, as indicated at 27. This is to prevent it from interfering with any parts which may not completely disengage themselves from the recesses 20 and 21 as they pass the upper end of the chute.

The delivery tube 25 may serve as a temporary reservoir or storage space for the hoppered parts and preferably the hopper is of sufficient size and operated at a sufficient speed that more parts than will normally be required are delivered down the chute 13 in a given period of operation. With this in mind, a drop-out device 26 is preferably provided between the lower end of chute 13 and the upper end of delivery tube 25. Member 26, in the case shown, is a relatively short tube with one or more of its sides cut away and so oriented that when tube 25 becomes filled, the excess parts will fall from tube 26 back into the hopper bowl. The delivery tube 25 is fitted at its upper end into tube 26 which, in turn, is fitted into the lower end of chute 13. This rigidly connects these parts so that a suitable bracket, not shown, clamped or otherwise attached at one end to tube 25 and rigidly attached at its opposite end to case 1, serves to retain the delivery tube 25, chute 13 and parts 15, 17 and 18 in their proper positions while the hopper bowl rotates.

The hopper may be motivated in any desired manner as for example, by an electric motor, not shown. Ordinarily, the desired speed of rotation of the hopper bowl will be in the neighborhood of 6 to 15 revolutions per minute, necessitating for practical purposes one or more stages of speed reduction between the motivating means and shaft 7. Such a speed reducer, of the enclosed gear type, is shown at 29 in Fig. 1. It has an input shaft 30, driven at relatively high speed, and a slow speed output shaft 31 which is connected with the driven shaft 7 and the hopper bowl.

The motivating means for the hopper may conveniently be a prime mover also used in the operation of the apparatus to which the hoppered parts are fed. In such instances, means for temporarily discontinuing rotation of the hopper bowl, without stopping the prime mover, is often desirable. A friction clutch is provided in the case illustrated for disengaging the hopper bowl from the prime mover between shaft 7 and gear reducer 29. This clutch also serves, by slipping under an abnormally heavy load, to stop rotation of the hopper bowl and prevent damage to any of the equipment in case a part becomes jammed in the hopper.

Figure 5:
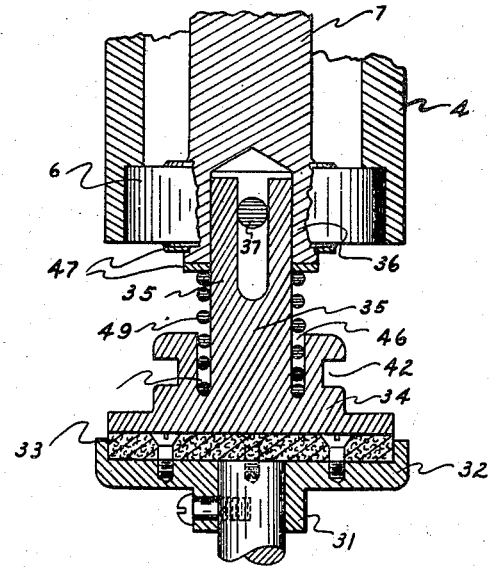
Fig. 5 is an enlarged detail, shown principally in section, of clutch plate 34 and the adjacent bearing 6.

The clutch, above mentioned (see Fig. 5), comprises a drive disc 32 secured to shaft 31 and normally engaged with a driven disc 34 through the medium of a suitable clutch facing 33 secured to disc 32. The driven disc 34 carries a short shaft 35 which is slotted at its upper end, as indicated at 36. Shaft 35 extends into a bore or recess provided in the lower portion of shaft 7 and a pin 37 extending across this bore and secured to shaft 7 engages the slot 36. Shaft 35, when rotated, thus drives shaft 7 and causes rotation of the hopper bowl, but the slot and pin permit shaft 35 to move longitudinally within the bore of shaft 7 so that disc 34 may be lowered and raised to engage and disengage it with the clutch facing 33.

The driving and driven members of the clutch are normally held in engagement by a coil spring 49 (see Fig. 5) partially housed in an annular recesss 46 provided in member 34 and bearing at its opposite end upon a suitable thrust washer 47 disposed between the spring and shaft 7. The clutch is disengaged to stop rotation of the hopper bowl by lifting the disc 34 from the clutch facing 33. This is accomplished, in the case illustrated, through the medium of a clutch collar 38 (see Fig. 1) attached to lever arm 39 which is pivoted at 40. Collar 38 carries pins, one of which is shown at 41 in Fig. 1, which slide in a groove 42 in member 34. Lever 39 may be depressed at its outer end to lift the clutch collar 38 and disc 34 by means of an eccentric 43 which is attached to shaft 44, on the opposite end of which a suitable knob 45 is provided. Suitable means, not shown, for holding the eccentric and lever 39 in the desired position are also provided.

Although the hopper bowl is here shown tilted to an angle of approximately 45°, it is entirely possible to operate it in any desired position varying from a much smaller angle from the horizontal to a perpendicular position. The angle of the chute 13 in relation to that of the hopper may also be varied to suit requirements. In practice, it has usually proven best to keep the downward incline of the chute at an angle of from about 25° to about 60° from the horizontal and to tilt the hopper bowl to at least about 35 to 40°. These optimum positions will vary somewhat with the characteristics of the particular parts being hoppered.

I claim as my invention:

In combination a hopper comprising a bowl, a support for said hopper, said support adapted and arranged so that said bowl is disposed at an angle of approximately 45° with respect to the horizontal, means for rotating the bowl, means providing a reservoir for a mass of articles formed with one end of lesser cross-section than the other in the lower portion of the bowl during rotation, a plurality of slots around the outer rim of the bowl for picking up unit articles from said mass and arranged so the unit articles enter the slot small end first, a discharge chute attached to the axis of said bowl and radially disposed upwardly in the direction away from said reservoir, means for delivering the unit articles from said slot into the upper end of said chute, means including a relatively flat pick off spring between the region of the hopper in which said articles enter the slot and the point at which they enter the discharge chute, said pick off spring adapted and arranged for picking off and returning to the mass any articles not properly arranged in the slot and further adapted and arranged to retain and allow to pass any articles which are properly arranged in said slot, said chute being further characterized by being constructed and arranged to receive said unit articles large end first from the slot and to discharge the same from its lower end, a portion of the wall of said chute being discontinuous at mid-section of the chute to provide an opening therein through which any excess of hoppered articles passing down the chute may fall back into said mass within the bowl when the lower portion of the chute beyond said opening becomes filled with the hoppered articles.

CHARLES H. ANGELL.

REFERENCES CITED

The following references are of record in the file of this patent:

UNITED STATES PATENTS

| Number | Name | Date |
| --- | --- | --- |
| 271,886 | Mason | Feb. 6, 1883 |
| 317,396 | Mason | May 5, 1885 |
| 441,388 | Bray | Nov. 25, 1890 |
| 1,340,432 | Benjamin | May 18, 1920 |
| 1,456,542 | Engler | May 29, 1923 |